US012659603B2

(12) United States Patent
Matsumoto et al.

(10) Patent No.: US 12,659,603 B2
(45) Date of Patent: Jun. 16, 2026

(54) IMAGE PROCESSING DEVICE, IMAGE PROCESSING METHOD, AND COMPUTER PROGRAM PRODUCT FOR ADJUSTING WHITE BALANCE OF AN IMAGE CAPTURED BY AN IMAGING DEVICE

(71) Applicant: Panasonic Automotive Systems Co., Ltd., Kanagawa (JP)

(72) Inventors: Yasutaka Matsumoto, Tokyo (JP); Yasuyuki Goda, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 29 days.

(21) Appl. No.: 18/797,190

(22) Filed: Aug. 7, 2024

(65) Prior Publication Data

US 2024/0397213 A1 Nov. 28, 2024

Related U.S. Application Data

(63) Continuation of application No. PCT/JP2023/000687, filed on Jan. 12, 2023.

(30) Foreign Application Priority Data

Mar. 16, 2022 (JP) ................................. 2022-041652

(51) Int. Cl.
| | |
|---|---|
| *H04N 23/88* | (2023.01) |
| *B60R 1/26* | (2022.01) |
| *H04N 23/73* | (2023.01) |

(52) U.S. Cl.
CPC ............... *H04N 23/88* (2023.01); *B60R 1/26* (2022.01); *H04N 23/73* (2023.01)

(58) Field of Classification Search
CPC ........ H04N 23/73; H04N 23/88; H04N 23/76; H04N 23/10; H04N 7/18; B60R 1/26; B60R 1/20
See application file for complete search history.

(56) References Cited

U.S. PATENT DOCUMENTS

| | | | |
|---|---|---|---|
| 10,509,973 | B2 | 12/2019 | Takemura et al. |
| 10,560,670 | B2 * | 2/2020 | Sato ........................ H04N 23/74 |

(Continued)

FOREIGN PATENT DOCUMENTS

| | | |
|---|---|---|
| JP | 2006054678 A | 2/2006 |
| JP | 2009171122 A | 7/2009 |

(Continued)

OTHER PUBLICATIONS

Decision to Grant a Patent, dated Jun. 10, 2025, Japanese Patent Application No. 2022-041652. (3 pages)(with English Translation).

(Continued)

*Primary Examiner* — Kelly L Jerabek

(74) *Attorney, Agent, or Firm* — Seed Intellectual Property Law Group LLP

(57) ABSTRACT

An image processing device according to the present disclosure includes a memory in which a program is stored; and a processor coupled to the memory and configured to perform processing by executing the program. The processing includes: acquiring, from an imaging device mounted inside a cabin of a vehicle, an image of an outside of the cabin captured through a window of the vehicle by the imaging device; acquiring a color temperature from the acquired image; detecting a color temperature range regarded as white by the imaging device from the acquired color temperature; adjusting white balance of the image based on the detected color temperature range; and outputting the image of which the white balance is adjusted.

20 Claims, 9 Drawing Sheets

(56)     References Cited

U.S. PATENT DOCUMENTS

| | | | |
|---|---|---|---|
| 10,582,131 B2 | 3/2020 | Nakayama | |
| 11,089,229 B2 | 8/2021 | Nakayama | |
| 11,539,894 B2 | 12/2022 | Nakayama | |
| 2013/0027560 A1* | 1/2013 | Seger | H04N 25/133 |
| | | | 348/E9.005 |
| 2013/0176416 A1 | 7/2013 | Fukui | |
| 2014/0022411 A1 | 1/2014 | Kano | |
| 2015/0142206 A1 | 5/2015 | Pierce | |
| 2019/0132564 A1* | 5/2019 | Wang | H04N 23/71 |
| 2022/0148485 A1* | 5/2022 | Takita | B60R 1/26 |

FOREIGN PATENT DOCUMENTS

| | | | |
|---|---|---|---|
| JP | 2010272934 A | 12/2010 | |
| JP | 2013143593 A | 7/2013 | |
| JP | 2014022998 A | 2/2014 | |
| JP | 2016537890 A | 12/2016 | |
| JP | 2018074191 A | 5/2018 | |
| JP | 6537385 B2 | 7/2019 | |
| JP | 6657925 B2 | 3/2020 | |
| JP | 2020150323 A | 9/2020 | |
| JP | 2022034185 A | 3/2022 | |
| WO | 2017122396 A1 | 7/2017 | |

OTHER PUBLICATIONS

Notice of Reasons for Refusal, dated Apr. 22, 2025, for Japanese Patent Application No. 2022-041652. (10 pages) (with English Translation).

English Translation of International Search Report dated Mar. 14, 2023, for the corresponding International Patent Application No. PCT/JP2023/000687, 2 pages.

Notice of Reasons for Refusal, dated Apr. 28, 2026, for Japanese Patent Application No. 2025-110363. (4 pages)(with English Translation).

* cited by examiner

| COLOR TEMPERATURE RANGE UNIT: [Kelvin (K)] | |
|---|---|
| BEFORE ADJUSTMENT (DETECTION VALUE) | 5250 TO 15000 |
| AFTER ADJUSTMENT (REFERENCE VALUE) | 4000 TO 8800 |

IMAGE PROCESSING DEVICE, IMAGE PROCESSING METHOD, AND COMPUTER PROGRAM PRODUCT FOR ADJUSTING WHITE BALANCE OF AN IMAGE CAPTURED BY AN IMAGING DEVICE

CROSS-REFERENCE TO RELATED APPLICATIONS

This application is a continuation of International Application No. PCT/JP2023/000687, filed on Jan. 12, 2023 which claims the benefit of priority of the prior Japanese Patent Application No. 2022-041652, filed on Mar. 16, 2022, the entire contents of which are incorporated herein by reference.

FIELD

Embodiments described herein relate generally to an image processing device, an image processing method, and a computer program product.

BACKGROUND

In recent years, the spread of a driving assistance system for a vehicle has increased a case where an imaging device is mounted on the vehicle. In addition, there is a case where an imaging device and an electronic mirror are mounted in a cabin of the vehicle, and an image of the rear of the vehicle captured by the imaging device is displayed on the electronic mirror.

On the other hand, for the purpose of lowering visibility of the inside of the cabin from the outside of the cabin, the vehicle has its rear window subjected to various types of processing such as transmittance reduction processing and coloring processing. Conventional technologies are described in Japanese Patent No. 6657925 and Japanese Patent No. 6537385, for example.

Meanwhile, in a case where an imaging device is mounted in the cabin, the rear view of the vehicle is imaged through the rear window. Therefore, when the rear window is subjected to the above-described processing, the color tone and quality of the image captured by the imaging device might change due to the influence of the rear window, leading to a failure in displaying a clear image on the electronic mirror.

The present disclosure provides an image processing device, an image processing method, and a computer program product capable of more clearly displaying an image captured by an imaging device provided in a cabin.

SUMMARY

An image processing device according to an embodiment of the present disclosure includes a memory in which a program is stored and a processor coupled to the memory and configured to perform processing by executing the program. The processing includes: acquiring, from an imaging device mounted in a cabin of a vehicle, an image of an outside of the cabin captured through a window provided in the vehicle by the imaging device; acquiring a color temperature from the acquired image; detecting a color temperature range regarded as white by the imaging device from the acquired color temperature; adjusting white balance of the image based on the detected color temperature range; and outputting the image of which the white balance is adjusted.

BRIEF DESCRIPTION OF THE DRAWINGS

FIG. 3 is a diagram illustrating an example of a configuration of an imaging device according to the first embodiment;

FIG. 4 is a diagram illustrating an example of a configuration of an electronic mirror according to the first embodiment;

DETAILED DESCRIPTION

First Embodiment

Hereinafter, an embodiment of an electronic mirror system according to a first embodiment will be described with reference to the drawings.

The electronic mirror system according to the first embodiment includes an imaging device and an electronic mirror, and the like mounted on a vehicle. The electronic mirror displays, for example, an image of the rear of the vehicle captured by the imaging device instead of a mirror for visually recognizing the rear of the vehicle.

Figure 1:
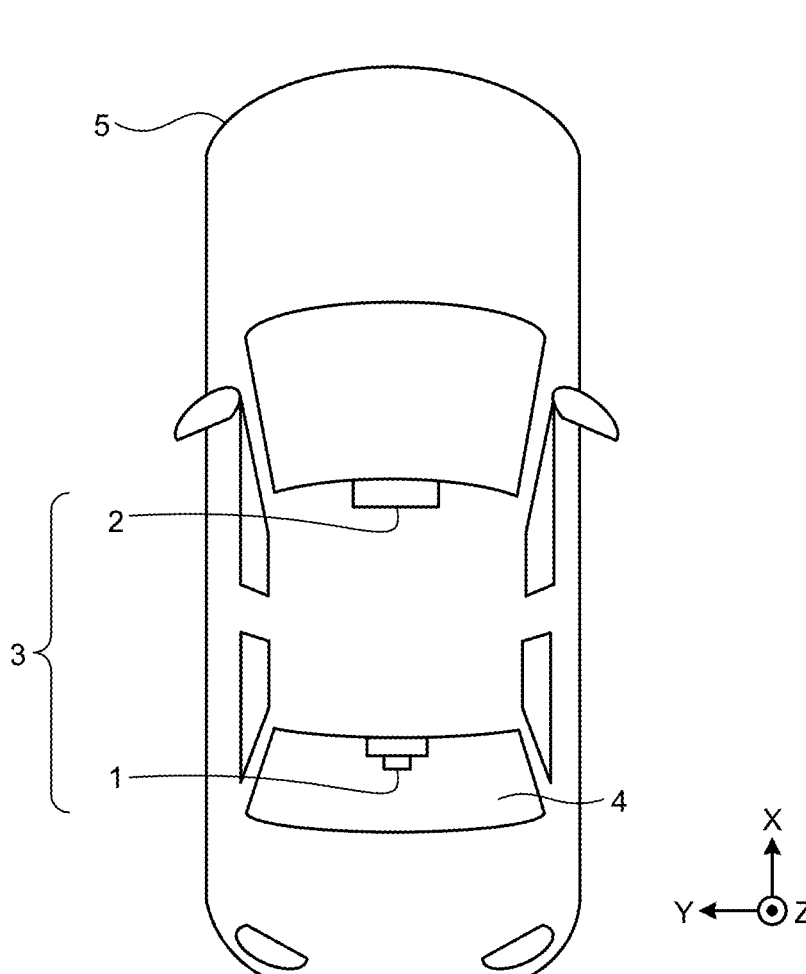
FIG. 1 is a diagram illustrating an example of a vehicle equipped with an electronic mirror system according to a first embodiment.

First, an overall configuration of an electronic mirror system 3 will be described with reference to FIG. 1. FIG. 1 is a diagram illustrating an example of a vehicle equipped with the electronic mirror system 3 according to the embodiment.

The electronic mirror system 3 is mounted on vehicle 5 and includes a camera 1 and an electronic mirror 2. The electronic mirror system 3 is an example of an image processing device according to the present disclosure.

The camera 1 is provided in the cabin of the vehicle 5. For example, the camera 1 is provided at a position at the rear of the cabin of the vehicle 5 and in front of a rear window 4, and is installed to face the rear of the vehicle 5 (on the negative side on an X axis). The camera 1 includes, for example, an imaging element such as a Complementary Metal Oxide Semiconductor (CMOS) or a Charge-Coupled Device (CCD), and images the rear of the vehicle 5. Note that the camera 1 is an example of an imaging device in the present disclosure.

The electronic mirror 2 has a function of an ordinary mirror-type rear view mirror and a function of displaying a video of the rear of the vehicle 5 captured by the camera 1.

Details of the structure of the electronic mirror 2 will be described below. The electronic mirror 2 is an example of a display apparatus in the present disclosure.

The electronic mirror 2 is disposed in the cabin. For example, the electronic mirror 2 has a display panel 23 on a surface facing the cabin (in a negative direction of the X axis illustrated in FIG. 1), and displays an image acquired by the camera 1 on the display panel 23. When the electronic mirror 2 is an electronic mirror to view the rear, the electronic mirror 2 may be installed in the form of a rear-view mirror, and the shape of the display panel 23 may be a shape of a mirror surface of the rear-view mirror.

Figure 2:
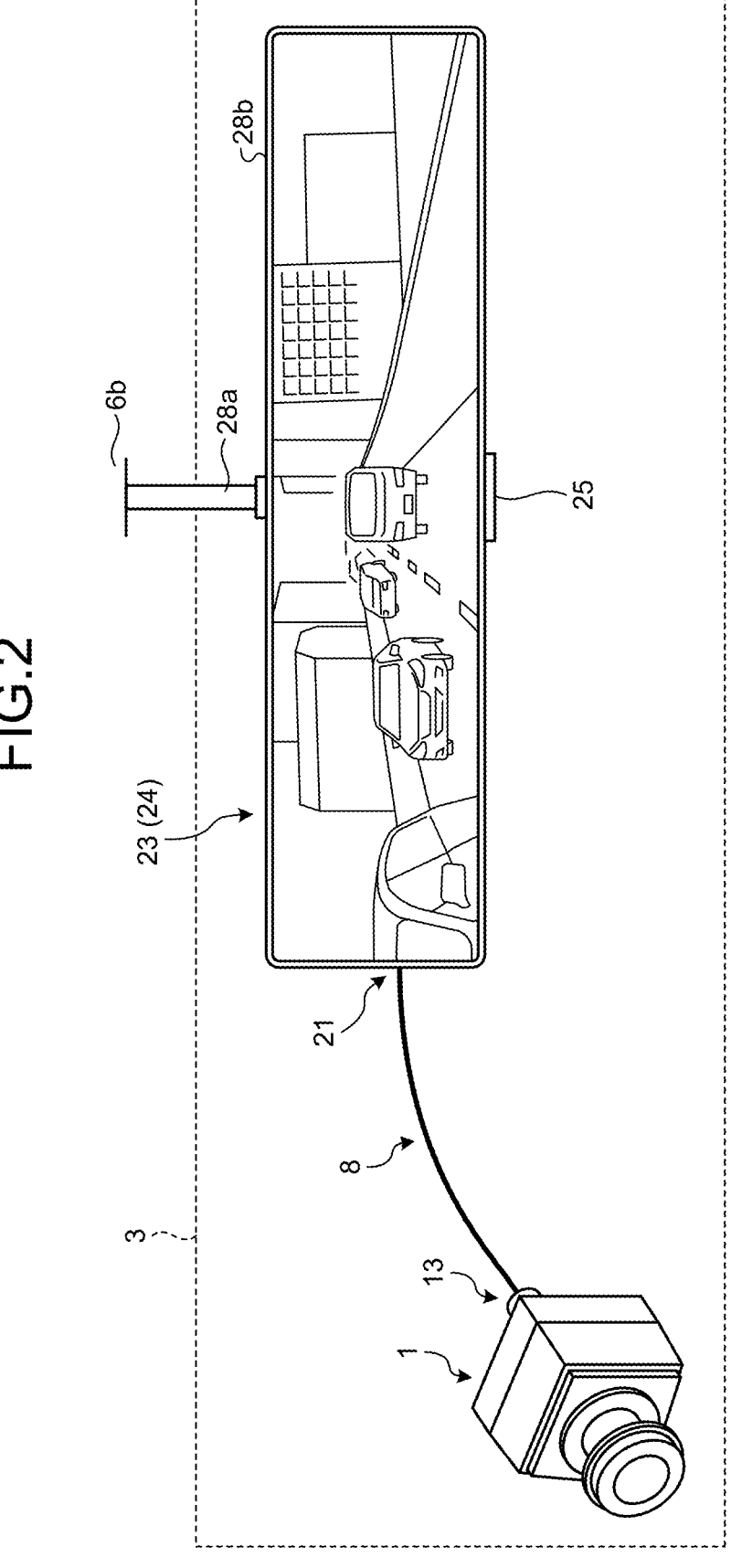
FIG. 2 is a diagram illustrating an example of a configuration of the electronic mirror system according to the first embodiment.

Next, a configuration of the electronic mirror system 3 will be described with reference to FIG. 2. In the electronic mirror system 3, the camera 1 and the electronic mirror 2 are communicably connected to each other via a communication medium 8 as illustrated in FIG. 2. FIG. 2 is a diagram illustrating a configuration of the electronic mirror system 3 according to the present embodiment. The communication medium 8 may be a communication cable such as a serial cable or a wireless communication channel such as Blu-etooth (registered trademark). FIG. 2 illustrates an exemplary configuration in which the communication medium 8 is a communication cable, and the communication medium 8 has one end connected to an I/F unit 13 of the camera 1 while having the other end connected to an I/F unit 21 of the electronic mirror 2.

The camera 1 captures an image of the rear side of a vehicle body 6, and supplies the acquired image to the electronic mirror 2 via the communication medium 8. With this configuration, the electronic mirror 2 receives an image captured by the camera 1, and displays the received image on the display panel 23. The electronic mirror 2 may display the entire region of the image captured by the camera 1, or may clip a part of the image (hereinafter, also referred to as a partial image) and display the clipped partial image on the display panel 23.

FIG. 2 illustrates a configuration in which a partial image clipped from the image captured by the camera 1 into a mirror surface shape of the rear-view mirror is displayed on the display panel 23 of the electronic mirror 2. A housing 28b of the electronic mirror 2 may be fixed to the inside of a roof 6b of the vehicle body 6 in a state where the posture of the housing 28b is variable. The housing 28b of the electronic mirror 2 may be fixed to the roof 6b of the vehicle body 6 via a support 28a.

The display panel 23 is, for example, a liquid crystal panel, an organic EL panel, or the like. There is a half mirror 24 disposed to face the display surface of the display panel 23. The half mirror 24 is an ordinary rear-view mirror.

There is provided an operation switch 25 below the housing 28b. By operating the operation switch 25, switching between a display image on the display panel 23 and a rear-view image of the vehicle 5 reflected on the half mirror 24 is performed. When the reflected image reflected on the half mirror 24 is displayed, the display panel 23 is in a non-display state.

The support 28a is a member that supports the housing 28b on the inside of the roof 6b of the vehicle. The housing 28b is a member that encloses the display panel 23. The housing 28b is supported on the inside of the roof 6b of the vehicle via the support 28a.

The electronic mirror 2 may finely adjust a position of a partial image to be clipped from the whole image according to the change of the posture of the housing 28b, and may clip the partial image to display on the display panel 23. With this operation, the electronic mirror 2 can display the image of the surroundings of the vehicle captured by the camera 1 according to the posture of the housing 28b, and thus can operate as a substitute for the mirror.

Figure 3:
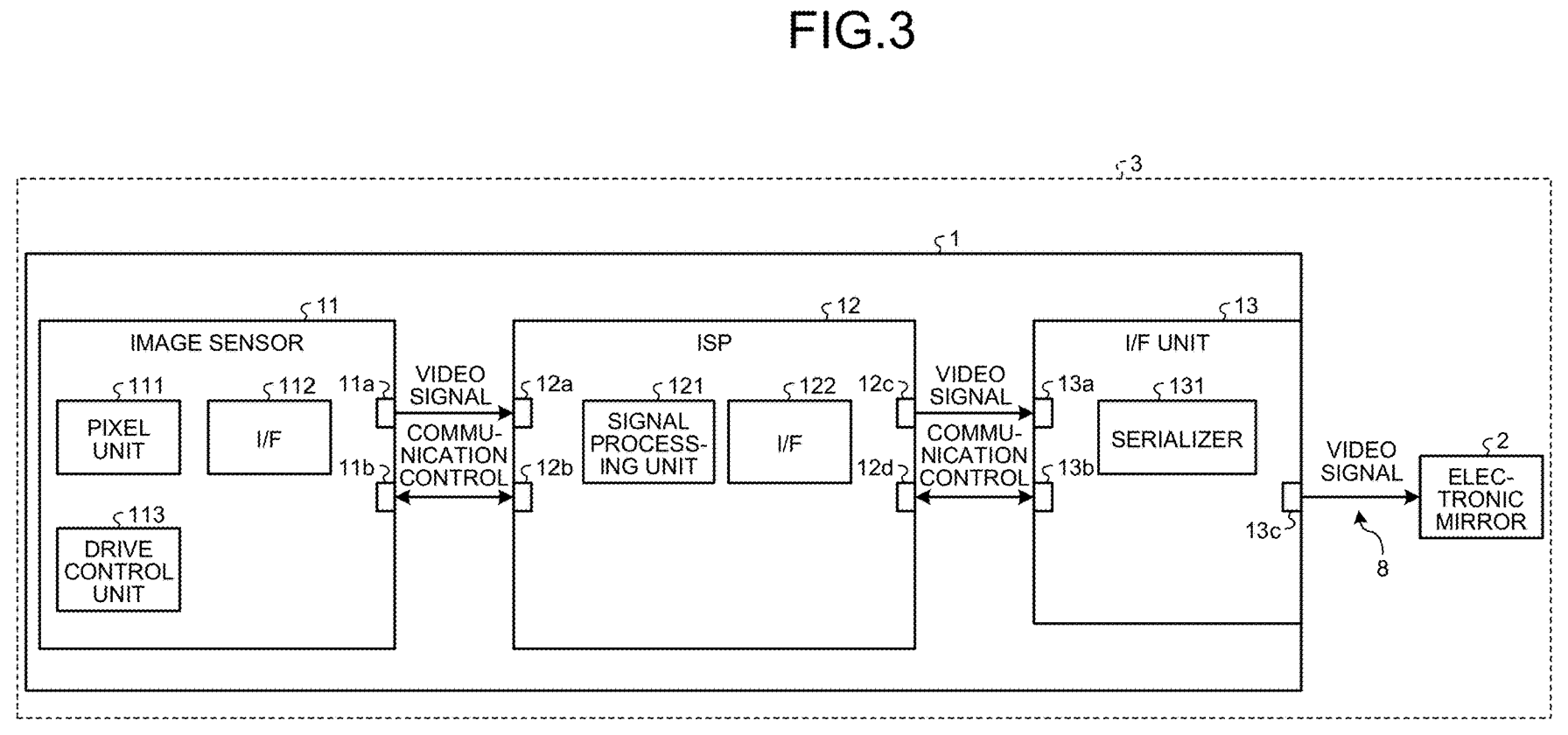

Next, a configuration of the camera 1 will be described with reference to FIG. 3. As illustrated in FIG. 3, the camera 1 includes an image sensor 11, an image signal processor (ISP) 12, and an interface (I/F) unit 13. FIG. 3 is a diagram illustrating a configuration of the camera 1 according to the present embodiment. The image sensor 11 includes a terminal 11a and a terminal 11b. The image signal processor 12 includes a terminal 12a, a terminal 12b, a terminal 12c, and a terminal 12d. The interface unit 13 includes a terminal 13a, a terminal 13b, and a terminal 13c.

For example, the image sensor 11 acquires an image of the rear of the vehicle 5, generates a plurality of pixel signals corresponding to the acquired image, and supplies the plurality of pixel signals to the image signal processor 12. The image sensor 11 includes a pixel unit 111, an interface (I/F) 112, and a drive control unit 113.

The pixel unit 111 includes a plurality of pixels arrayed in a plurality of rows and a plurality of columns, with a plurality of AD converters (a plurality of ADCs) arrayed corresponding to the plurality of columns. The pixel unit 111 performs a charge accumulation operation in a plurality of pixels according to a subject image (image) formed on the imaging surface, and performs AD conversion on the accumulated signals of the plurality of pixels for each column by an AD converter to generate a plurality of pixel signals.

The interface 112 exchanges communication control information with the image signal processor 12 via the terminal 11b and the terminal 12b, thereby establishing communication with the image signal processor 12. The interface 112 may establish the communication with the image signal processor 12 according to a Serial Peripheral Interface (SPI) system. The interface 112 transmits the plurality of pixel signals output from the pixel unit 111 to the image signal processor 12 as an image of one frame via the terminal 11a and the terminal 12a. The interface 112 can transmit images of a plurality of temporally continuous frames as video signals to the image signal processor 12 via the terminal 11a and the terminal 12a.

The drive control unit 113 includes a vertical scanning circuit and a horizontal scanning circuit. The vertical scanning circuit scans a plurality of pixels in a vertical direction according to a vertical drive signal (VD), and performs drive, in units of rows, for the control of the charge accumulation operation of the plurality of pixels and the like. The horizontal scanning circuit scans a plurality of pixels in a horizontal direction according to a horizontal drive signal (HD), and performs drive, in units of columns, for readout of pixel signals from the plurality of pixels and AD conversion on the pixel signals.

The image signal processor 12 receives, from the image sensor 11, a plurality of pixel signals corresponding to the image and performs predetermined signal processing on the plurality of pixel signals. The image signal processor 12 includes a signal processing unit 121 and an interface (I/F) 122.

The signal processing unit 121 includes an AD converter and an address processing circuit, and performs predetermined signal processing on a plurality of pixel signals using the AD converter and the address processing circuit. The predetermined signal processing includes processing of adjusting a dynamic range of a signal and NR correction processing of reducing noise included in the signal. In a case where the pixel unit 111 corresponds to a color such as including a color filter in each pixel, the predetermined signal processing may further include YC signal processing of generating, from the pixel signal, a YC signal including a luminance component (Y) and a chrominance component (C).

The signal processing unit 121 includes a processor such as a central processing unit (CPU) and memory such as flash memory. The signal processing unit 121 implements a function as the signal processing unit 121 by execution of a program loaded in the memory by the processor. Note that functions of the signal processing unit 121 will be described below.

The interface 122 exchanges communication control information with the interface unit 13 via the terminal 12*d* and the terminal 13*b*, and establishes communication with the interface unit 13. The interface 122 may establish communication with the interface unit 13 according to an inter-integrated circuit (I2C) system.

The interface 122 transmits the plurality of pixel signals output from the signal processing unit 121 to the interface unit 13 as an image of one frame via the terminal 12*c* and the terminal 13*a*. The interface 122 can transmit images of a plurality of temporally continuous frames as video signals to the interface unit 13 via the terminal 12*c* and the terminal 13*a*.

The interface unit 13 notifies the electronic mirror 2 of a failure detected by the image sensor 11 and/or the image signal processor 12. The interface unit 13 is connected to the electronic mirror 2 via the communication medium 8.

The interface unit 13 performs format conversion of a signal in communication. In a case where the communication medium 8 is compatible with serial communication, the interface unit 13 may include a serializer 131.

The serializer 131 converts a video signal received from the image sensor 11 and/or the image signal processor 12 via the terminal 13*a* from a parallel format to a serial format, and transmits the video signal in the serial format to the electronic mirror 2 via the terminal 13*c* and the communication medium 8. The serializer 131 converts the communication control information received from the image sensor 11 and/or the image signal processor 12 via the terminal 13*b* from a parallel format to a serial format, and transmits the communication control information in the serial format to the electronic mirror 2 via the terminal 13*c* and the communication medium 8.

Figure 4:
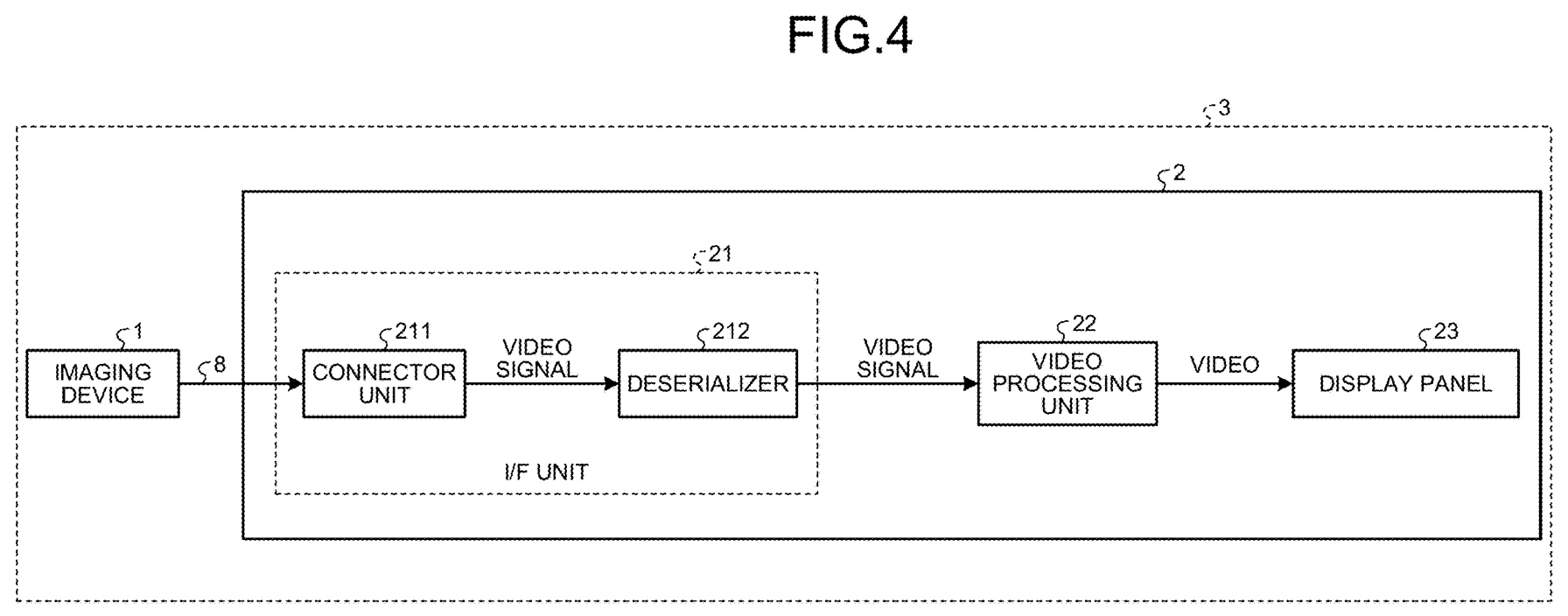

Next, a configuration of the electronic mirror 2 will be described with reference to FIG. 4. As illustrated in FIG. 4, electronic mirror 2 includes an interface (I/F) unit 21, a video processing unit 22, and a display panel 23. FIG. 4 is a diagram illustrating a configuration of the electronic mirror 2 according to the present embodiment.

The interface unit 21 is connected to the camera 1 via the communication medium 8. The interface unit 21 includes a connector unit 211, with the camera 1 connected to the connector unit 211 via the communication medium 8. The interface unit 21 performs format conversion of a signal in communication. When the communication medium 8 is compatible with serial communication, the interface unit 13 may include a deserializer 212.

The deserializer 212 converts the video signal transmitted from the camera 1 via the communication medium 8 and the connector unit 211 from a serial format to a parallel format, and transmits the video signal in the parallel format to the video processing unit 22. The transmission of the video signal from the connector unit 211 to the deserializer 212 may be performed by communication according to a Flat Panel Display-Link (FPD-Link) system. The transmission of the video signal from the deserializer 212 to the video processing unit 22 may be performed by communication according to a Mobile Industry Processor Interface (MIPI) system.

The video processing unit 22 converts the video signal transmitted from the deserializer 212 into a video signal for display and supplies the video signal to the display panel 23. The display panel 23 displays the video signal converted by the video processing unit 22.

Although not illustrated in FIG. 4, the electronic mirror 2 includes the half mirror 24 installed to be overlaid with the display panel 23 as described with reference to FIG. 2. With the operation of the operation switch 25, the electronic mirror 2 switches between the display of the video signal displayed on the display panel 23 and the display of the reflected image of the rear of the vehicle 5 appearing on the half mirror 24.

Figure 5:
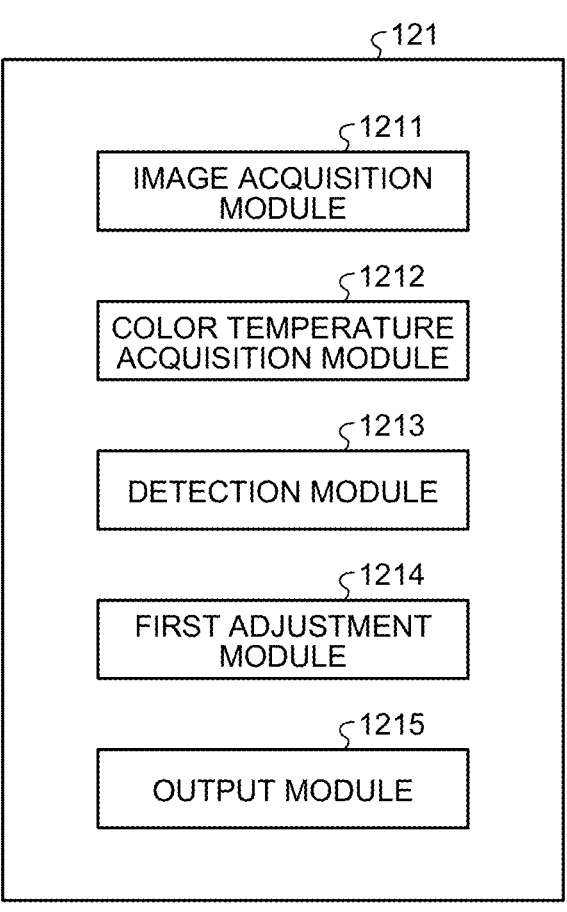
FIG. 5 is a block diagram illustrating an example of a functional configuration of the imaging device according to the first embodiment.

Next, functions of the signal processing unit 121 will be described with reference to FIG. 5. FIG. 5 is a block diagram illustrating an example of functions of the signal processing unit 121. The signal processing unit 121 includes an image acquisition module 1211, a color temperature acquisition module 1212, a detection module 1213, a first adjustment module 1214, and an output module 1215. Note that the function of the signal processing unit 121 is not limited thereto.

The image acquisition module 1211 acquires an image captured by the camera 1. Specifically, from the camera 1 mounted in the cabin of the vehicle 5, an image of the outside of the cabin captured through the rear window 4 of the vehicle 5 equipped with the camera 1.

The color temperature acquisition module 1212 acquires a color temperature from the image captured by the camera 1. Specifically, the color temperature acquisition module 1212 acquires the color temperature from the image acquired by the image acquisition module 1211. Color temperature will be described below.

The detection module 1213 detects a color temperature range from the color temperature acquired by the color temperature acquisition module 1212. Specifically, the detection module 1213 detects a color temperature range regarded as white by the camera 1 from the color temperature acquired by the color temperature acquisition module 1212.

The first adjustment module 1214 is an example of an adjustment module. The first adjustment module 1214 adjusts white balance based on the color temperature range detected by the detection module 1213. Specifically, the first adjustment module 1214 adjusts the white balance on the color temperature range detected by the detection module 1213 so that the image captured through the rear window 4 by the camera 1 mounted in the cabin becomes the same color temperature as an image to be captured by the camera 1 mounted outside the vehicle, that is, an image to be obtained without the rear window 4. The result of white balance adjustment by the first adjustment module 1214 is stored in the memory.

The output module 1215 outputs the image of which the white balance is adjusted by the first adjustment module 1214. Specifically, the output module 1215 outputs to the electronic mirror 2 the image of which the white balance is adjusted by the first adjustment module 1214.

Figure 6:
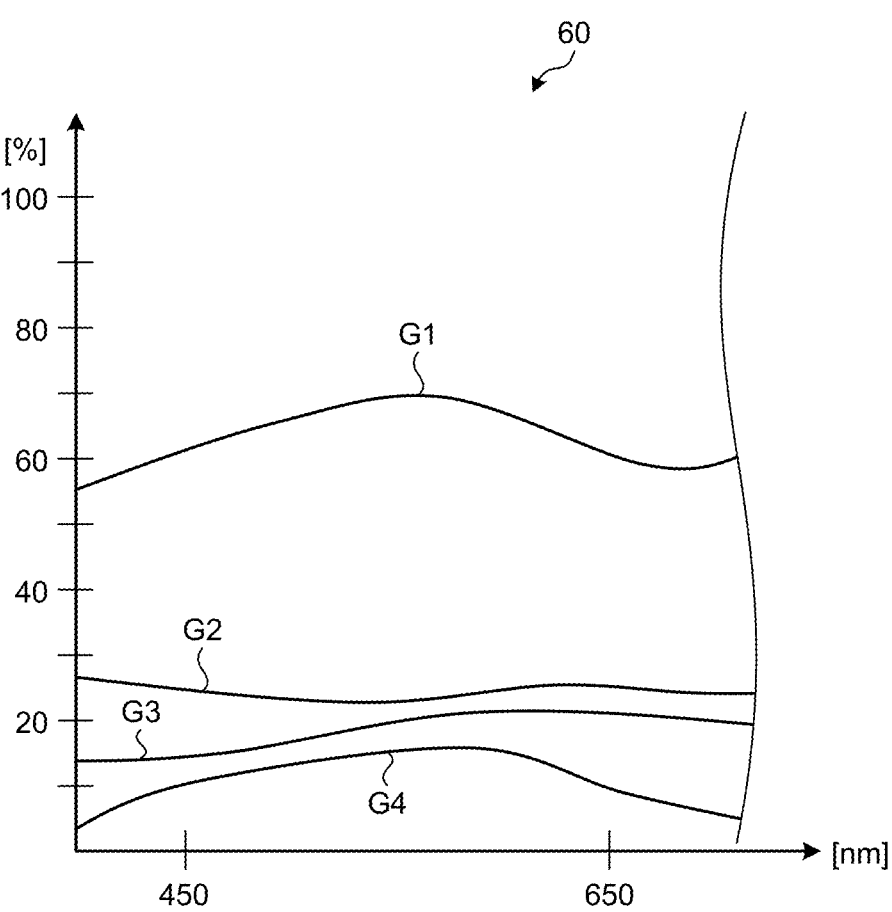
FIG. 6 is a diagram illustrating an example of characteristics of a rear window.

Here, transmittance characteristics of the rear window 4 will be described with reference to FIG. 6. FIG. 6 is a diagram illustrating an example of characteristics of the rear window 4. In a graph 60 illustrated in FIG. 6, the horizontal axis represents wavelength [nm], and the vertical axis represents transmittance [%]. The state of the wavelength at the transmittance of 100% corresponds to a state without the rear window 4.

The characteristics of the rear window 4 can be expressed by, for example, a relationship between wavelength and transmittance. For example, the rear window 4 having the characteristics of graph G1 has a transmittance of approximately 60% in a wavelength range of 450 nm to 650 nm included in visible light. The rear window 4 having the characteristics of graph G2 has a transmittance of 25% in a wavelength range of 450 nm to 650 nm. The rear window 4 having the characteristics of graph G3 has a transmittance of approximately 15% in a wavelength range of 450 nm to 650 nm. The rear window 4 having the characteristics of graph G4 has a transmittance of approximately 10% in a wavelength range of 450 nm to 650 nm.

When imaging the rear of the vehicle through the rear window 4, the camera 1 is affected by the transmittance of the rear window 4, and thus the color temperature of the captured image is different from the color temperature of an image captured without the rear window 4. In the image captured by the camera 1, the greater the difference in transmittance for each wavelength, the greater the shift of the color temperature range regarded as white, making it necessary to adjust the white balance according to the characteristics of the rear window 4.

Figures 7, 8:
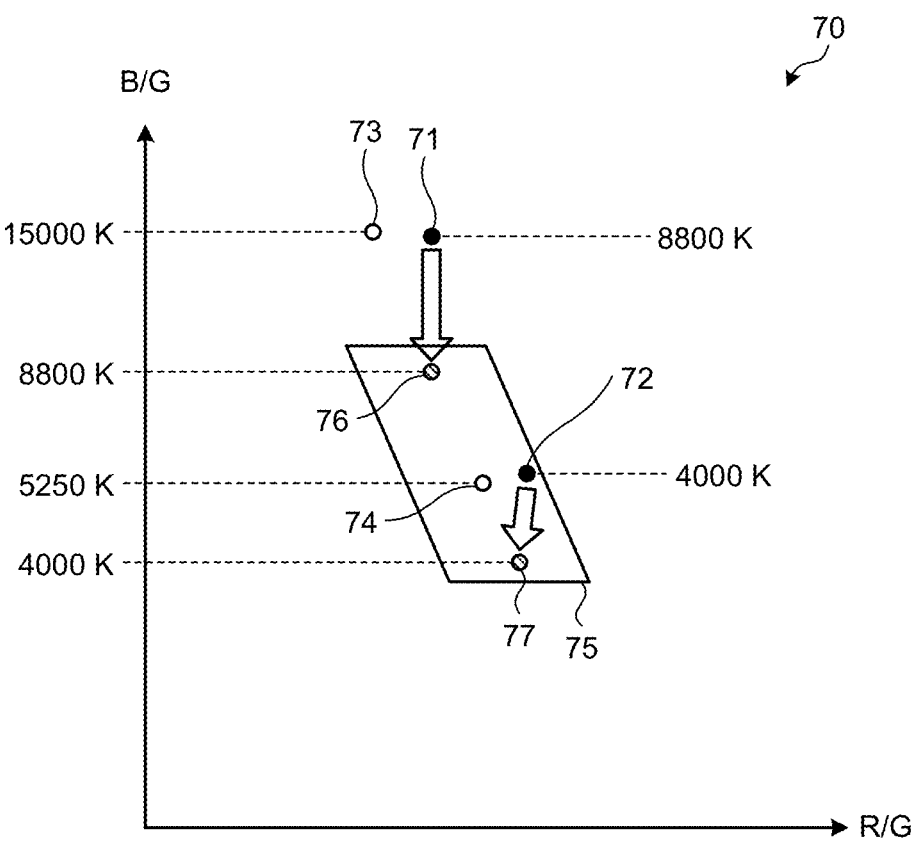
FIG. 7 is a diagram illustrating an example of a white detection range detected by the imaging device according to the first embodiment.
FIG. 8 is a table illustrating an example of a color temperature range to be corrected by the electronic mirror system according to the first embodiment.

Next, specifics of white balance adjustment performed by the first adjustment module 1214 will be described with reference to FIGS. 7 and 8. FIG. 7 is a diagram illustrating an example of a color temperature range detected by the imaging device detected by the detection module 1213. FIG. 8 is a table 80 illustrating an example of adjustment specifics of white balance adjustment performed by the first adjustment module 1214.

A graph 70 in FIG. 7 illustrates spectral sensitivity ratios in which the horizontal axis represents R/G, and the vertical axis represents B/G. The color temperature 71 and the color temperature 72 are color temperatures when an image is captured by the camera 1 provided outside the cabin (not through the rear window 4). The color temperature 73 and the color temperature 74 are color temperatures acquired by the color temperature acquisition module 1212, and are color temperatures when an image is captured through the rear window 4 by the camera 1 provided in the cabin. The detection module 1213 detects a color temperature range 75 regarded as white by the camera 1 from the color temperature 73 and the color temperature 74 acquired by the color temperature acquisition module 1212.

The color temperature range 75 is a white detection color temperature range (a range regarded as white) in the automatic white balance function by the first adjustment module 1214. The color temperature 76 and the color temperature 77 are color temperatures when an image is captured through the rear window 4 by the camera 1 provided in the cabin as a result of adjusting the color temperature by the first adjustment module 1214.

The color temperatures of the color temperature 71 and the color temperature 76 are 8800 Kelvin [K]. The color temperature of the color temperature 72 and the color temperature 77 is 4000 Kelvin [K]. The color temperature of the color temperature 73 is 15000 Kelvin [K]. The color temperature of the color temperature 74 is 5250 Kelvin [K].

For example, in a case where the white detection color temperature range outside the cabin is 4000 K to 8000 K, when the camera 1 captures an image of the rear of the vehicle through the rear window 4 in the cabin, the color temperature range detected by the detection module 1213 corresponds to 5250 K to 15000 K. In this case, the camera 1 may capture the sky or shade with a high color temperature. When an image captured by the camera 1 is displayed on electronic mirror 2, the image is displayed as a dark image.

Therefore, the first adjustment module 1214 adjusts the signal level of the RGB signal included in the video signal output from the image sensor 11 in accordance with the color temperature of the rear window 4. For example, when the detected value of the color temperature detected by the detection module 1213 is 5250 K to 15000 K, the first adjustment module 1214 refers to the table 80 illustrated in FIG. 8 and adjusts the color temperature range to the range 4000 K to 8800 K.

With this adjustment, when the camera 1 provided in the cabin captures an image in the color temperature range adjusted by the first adjustment module 1214, the camera 1 can capture an image equivalent to the image captured outside the cabin. In addition, the electronic mirror 2 displays the image of which the white balance is adjusted, making it possible to display the image with higher clarity.

In the first embodiment, the first adjustment module 1214 acquires the color temperature from the image captured by the camera 1, then detects the white detection color temperature range, and adjusts the white balance on the detected color temperature range. However, for example, the user may manually input the color temperature regarded as white to adjust the white balance on the input range.

As described above, the image processing device according to the first embodiment detects a color temperature range regarded as white from the acquired color temperature, adjusts white balance on the color temperature range, and outputs the adjusted image. This makes it possible for the image processing device according to the first embodiment to more clearly display the image captured by the imaging device provided in the cabin.

Second Embodiment

Next, a second embodiment will be described. Description common to the above-described first embodiment will be omitted as appropriate. Components similar to those in the first embodiment are denoted by the same reference numerals, and description thereof will be omitted as appropriate.

The above first embodiment has described a mode in which the camera 1 adjusts white balance on the detected color temperature range. The second embodiment will describe a mode in which the camera 1 adjusts a gain according to input illuminance. The gain is a parameter used for adjusting the brightness at the time of image capturing by the camera 1, and specifically corresponds to an adjustment value of a pixel signal generated by the image sensor 11.

In order to ensure brightness equivalent to brightness of an imaging device mounted outside the cabin, the camera 1 according to the second embodiment first sets the exposure time to 16.6 msec (=60 fps) similarly to the imaging device mounted outside the cabin. The exposure amount of the camera 1 is set to −12 dB. Setting the exposure amount of the camera 1 makes it possible to ensure substantially the same brightness as that of the imaging device mounted outside the cabin.

Figure 9:
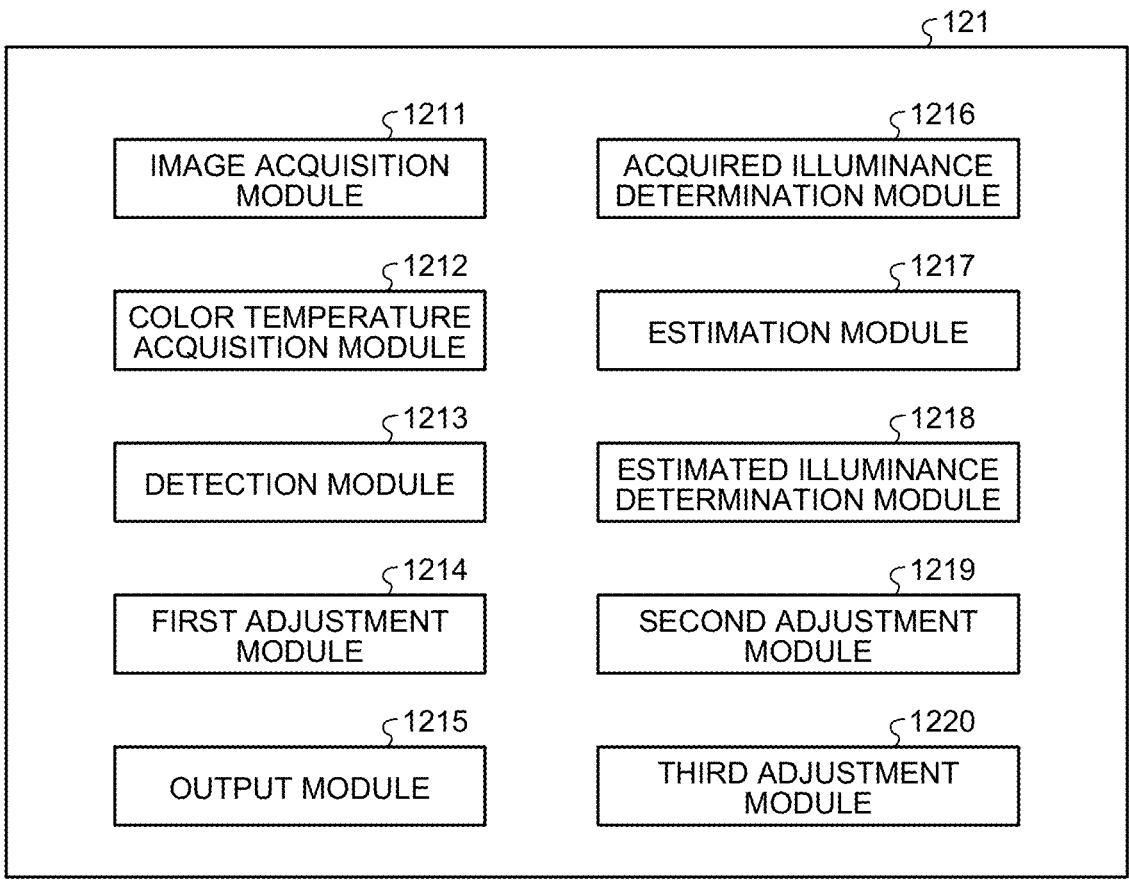
FIG. 9 is a block diagram illustrating an example of a functional configuration of an imaging device according to a second embodiment.

FIG. 9 is a block diagram illustrating an example of a configuration of functions provided in the signal processing unit 121 according to the second embodiment. The signal processing unit 121 includes the image acquisition module 1211, the color temperature acquisition module 1212, the detection module 1213, the first adjustment module 1214, the output module 1215, an acquired illuminance determination module 1216, an estimation module 1217, an estimated illuminance determination module 1218, a second adjustment module 1219, and a third adjustment module 1220. Note that the function of the signal processing unit 121 is not limited thereto.

The acquired illuminance determination module 1216 determines whether the input illuminance acquired from the image sensor 11 has reached a target value. The acquired illuminance determination module 1216 is an example of a determination module. Specifically, the acquired illuminance determination module 1216 determines whether the input illuminance acquired from the image sensor 11 has reached a target value indicating an input illuminance equivalent to that outside the cabin.

The estimation module 1217 estimates an illuminance, that is, obtains an estimated illuminance. Specifically, when having determined that the input illuminance acquired by the acquired illuminance determination module 1216 has not reached the target value, the estimation module 1217 estimates the acquired input illuminance as the estimated illuminance.

The estimated illuminance determination module 1218 is an example of a determination module. The estimated illuminance determination module 1218 determines whether the estimated illuminance exceeds a first threshold. Specifically, the estimated illuminance determination module 1218 determines whether the estimated illuminance estimated by the estimation module 1217 exceeds the first threshold. In addition, the estimated illuminance determination module 1218 determines whether the estimated illuminance exceeds a second threshold. Specifically, the estimated illuminance determination module 1218 determines whether the estimated illuminance estimated by the estimation module 1217 exceeds the second threshold.

Furthermore, the estimated illuminance determination module 1218 determines whether the estimated illuminance exceeds a third threshold. Specifically, the estimated illuminance determination module 1218 determines whether the estimated illuminance estimated by the estimation module 1217 exceeds the third threshold.

Here, the first threshold, the second threshold, and the third threshold will be described. The first threshold is in a range of 100 lux to 200 lux, for example. The second threshold is in a range of 30 lux to 60 lux, for example. The third threshold is in a range of 10 lux to 20 lux, for example.

When the estimated illuminance determination module 1218 determines that the estimated illuminance is lower than the first threshold, the second adjustment module 1219 performs adjustment to increase the gain. Specifically, when the estimated illuminance determination module 1218 determines that the estimated illuminance estimated by the estimation module 1217 is lower than the first threshold, the second adjustment module 1219 adjusts the pixel unit 111 to increase the gain.

In a case where the illuminance estimated by the estimation module 1217 is lower than the first threshold, the camera 1 is in a state where the illuminance of the subject to be imaged is too low to acquire a clear image. Therefore, for example, the second adjustment module 1219 adjusts the gain of the pixel unit 111 to be higher by +9 dB than the exposure amount set for the outside the cabin. As a result, the exposure amount of the camera 1 becomes −3 dB, and the brightness becomes substantially equal to that of the imaging device mounted outside the cabin. This makes it possible for the camera 1 to capture a clear image.

When the estimated illuminance determination module 1218 determines that the determination illuminance is higher than the second threshold, the second adjustment module 1219 performs adjustment to decrease the gain. Specifically, when the estimated illuminance determination module 1218 determines that the estimated illuminance estimated by the estimation module 1217 is higher than the second threshold, the second adjustment module 1219 adjusts the pixel unit 111 to decrease the gain.

In a case where the illuminance estimated by the estimation module 1217 is higher than the second threshold, the camera 1 is in a state where the illuminance of the subject to be imaged is too high to acquire a clear image. Therefore, for example, the second adjustment module 1219 performs adjustment on the pixel unit 111 so as to lower the gain (that is, the gain once increased is decreased by −9 dB). As a result, the exposure amount of the camera 1 becomes −12 dB, and the brightness becomes substantially equal to that of the imaging device mounted outside the cabin. Furthermore, the second adjustment module 1219 may also adjust the pixel unit 111 to perform compensation by tone correction. As a result, it is possible to maintain substantially the same brightness as the setting for the outside of the cabin. This makes it possible for the camera 1 to capture a clear image.

In a case where the estimated illuminance determination module 1218 determines that the estimated illuminance is lower than the second threshold, the third adjustment module 1220 makes an adjustment to lengthen the exposure. Specifically, in a case where the estimated illuminance determination module 1218 determines that the estimated illuminance estimated by the estimation module 1217 is lower than the second threshold, the third adjustment module 1220 adjusts the pixel unit 111 to lengthen the exposure.

In a case where the illuminance estimated by the estimation module 1217 is lower than the second threshold, the camera 1 is in a state where the illuminance of the subject to be imaged is too low to acquire a clear image. Therefore, for example, the third adjustment module 1220 adjusts the pixel unit 111 to set the exposure time from 16.6 msec to 33.3 msec so as to lengthen the exposure. As a result, it is possible to maintain substantially the same brightness as the setting for the outside of the cabin. This makes it possible for the camera 1 to capture a clear image.

In addition, when the estimated illuminance determination module 1218 determines that the value is higher than the third threshold, the third adjustment module 1220 performs adjustment to shorten the exposure. Specifically, in a case where the estimated illuminance determination module 1218 determines that the estimated illuminance estimated by the estimation module 1217 is higher than the third threshold, the third adjustment module 1220 adjusts the pixel unit 111 to shorten the exposure.

In a case where the illuminance estimated by the estimation module 1217 is higher than the third threshold, the camera 1 is in a state where the illuminance of the subject to be imaged is too high to acquire a clear image. Therefore, for example, the third adjustment module 1220 adjusts the pixel unit 111 to set the exposure time from 33.3 msec to 16.6 msec so as to perform a shorter exposure. Furthermore, the third adjustment module 1220 may also adjust the pixel unit 111 to perform compensation by tone correction. As a result, it is possible to maintain substantially the same brightness as the setting for the outside of the cabin. This makes it possible for the camera 1 to capture a clear image.

Next, a flow of processing executed in the electronic mirror system 3 configured as described above will be described.

11

Figure 10:
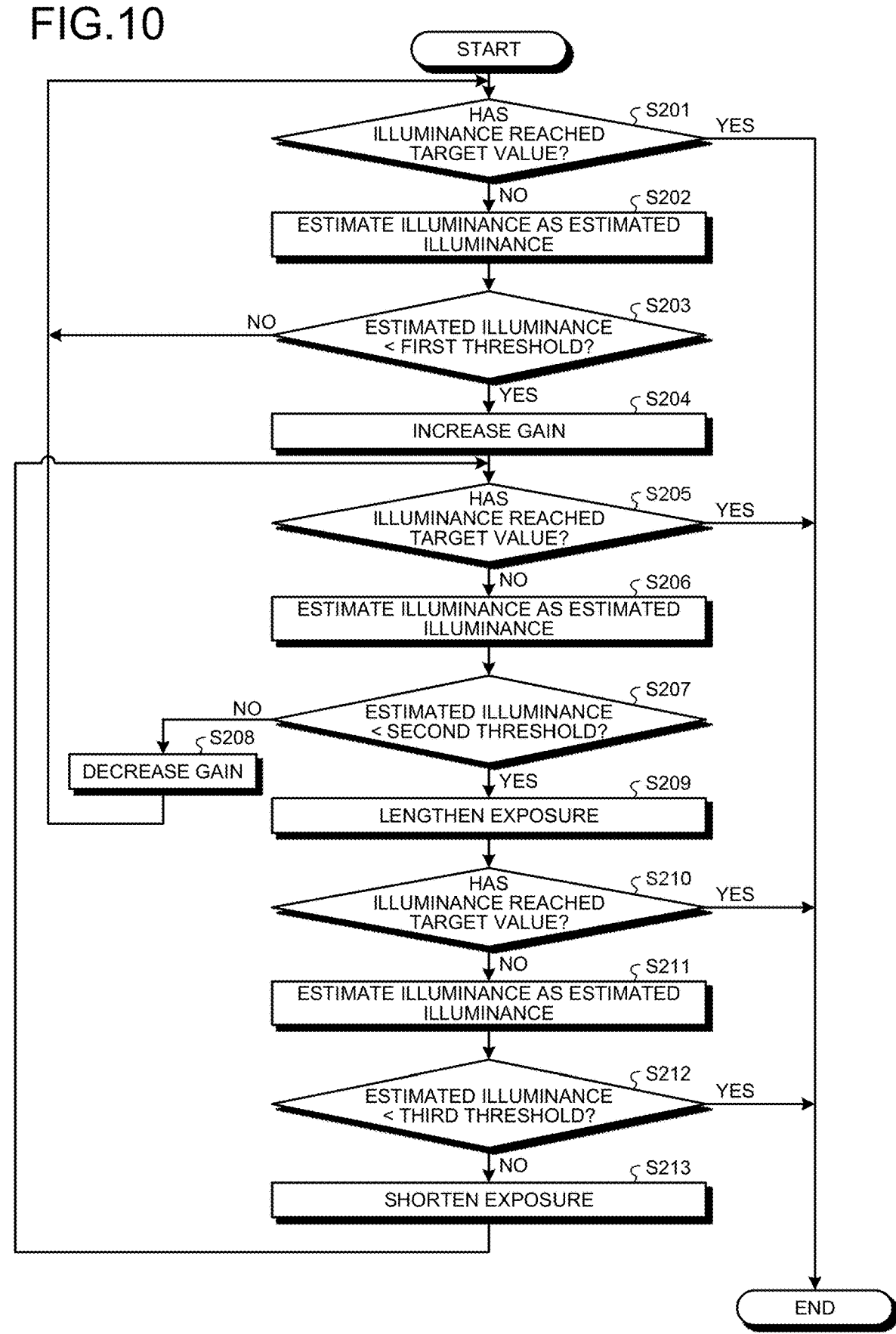
FIG. 10 is a flowchart illustrating an example of an operation of an electronic mirror system according to the second embodiment.

FIG. 10 is a flowchart illustrating an example of a flow of processing executed in the electronic mirror system 3 according to the second embodiment.

First, in FIG. 10, in order to ensure brightness equivalent to brightness of an imaging device mounted outside the cabin, the camera 1 according to the second embodiment sets the exposure time to 16.6 msec (=60 fps) similarly to the imaging device mounted outside the cabin.

The acquired illuminance determination module 1216 determines whether the input illuminance acquired from the image sensor 11 has reached a target value (step S201). Here, when the acquired illuminance determination module 1216 determines that the input illuminance acquired from the image sensor 11 has reached the target value (step S201: Yes), the processing ends. When the acquired illuminance determination module 1216 determines that the input illuminance acquired from the image sensor 11 has not reached the target value (step S201: No), the processing proceeds to step S202.

The estimation module 1217 estimates the input illuminance acquired by the acquired illuminance determination module 1216 as an estimated illuminance (step S202).

Subsequently, the estimated illuminance determination module 1218 determines whether the estimated illuminance is lower than the first threshold (step S203). Here, when the estimated illuminance determination module 1218 determines that the estimated illuminance is not lower than the first threshold (step S203: No), the processing proceeds to step S201. When the estimated illuminance determination module 1218 determines that the estimated illuminance is lower than the first threshold (step S203: Yes), the processing proceeds to step S204.

The second adjustment module 1219 adjusts the pixel unit 111 to increase the gain (step S204).

Subsequently, the acquired illuminance determination module 1216 determines whether the input illuminance acquired from the image sensor 11 has reached the target value (step S205). Here, when the acquired illuminance determination module 1216 determines that the input illuminance acquired from the image sensor 11 has reached the target value (step S205: Yes), the processing ends. When the acquired illuminance determination module 1216 determines that the input illuminance acquired from the image sensor 11 has not reached the target value (step S205: No), the processing proceeds to step S206.

The estimation module 1217 estimates the input illuminance acquired by the acquired illuminance determination module 1216 as the estimated illuminance (step S206).

Subsequently, the estimated illuminance determination module 1218 determines whether the estimated illuminance is lower than the second threshold (step S207). Here, when the estimated illuminance determination module 1218 determines that the estimated illuminance is not lower than the second threshold (step S207: No), the processing proceeds to step S208. When the estimated illuminance determination module 1218 determines that the estimated illuminance is lower than the second threshold (step S207: Yes), the processing proceeds to step S209.

The second adjustment module 1219 adjusts the pixel unit 111 to decrease the gain (step S208).

The third adjustment module 1220 adjusts the pixel unit 111 to lengthen the exposure (step S209).

Subsequently, the acquired illuminance determination module 1216 determines whether the input illuminance acquired from the image sensor 11 has reached the target value (step S210). Here, when the acquired illuminance determination module 1216 determines that the input illuminance acquired from the image sensor 11 has reached the target value (step S210: Yes), the processing ends. When the acquired illuminance determination module 1216 determines that the input illuminance acquired from the image sensor 11 has not reached the target value (step S210: No), the processing proceeds to step S211.

The estimation module 1217 estimates the input illuminance acquired by the acquired illuminance determination module 1216 as the estimated illuminance (step S211).

Subsequently, the estimated illuminance determination module 1218 determines whether the estimated illuminance is lower than the third threshold (step S212). Here, when the estimated illuminance determination module 1218 determines that the estimated illuminance is lower than the third threshold (step S212: Yes), the processing ends. When the estimated illuminance determination module 1218 determines that the estimated illuminance is not lower than the third threshold (step S212: No), the processing proceeds to step S213.

The third adjustment module 1220 adjusts the pixel unit 111 so as to shorten the exposure (step S213). Thereafter, the processing returns to step S201.

As described above, in the image processing device of the second embodiment, the gain is adjusted according to the input illuminance acquired by the imaging device. With this configuration, the image processing device of the second embodiment can clearly display the image of the electronic mirror 2 by adjusting the gain.

The above-described embodiment can be implemented with appropriate modifications by changing a part of the configuration or function of each apparatus described above. Therefore, in the following, some modifications according to the above-described embodiment will be described as other embodiments. In the following description, points different from the above-described embodiment will be mainly described, and detailed description of points common to the above description will be omitted. In addition, the modifications described below may be implemented individually, or may be implemented in appropriate combination.

The embodiment above has described a mode in which the camera 1 adjusts the exposure time according to the estimated illuminance. However, when the travel environment of the vehicle 5 is at night, there is a possibility that the exposure time is frequently switched. Accordingly, the following will describe a mode in which the camera 1 adjusts the exposure time according to the estimated illuminance as a modification.

Modification

For example, when the image displayed on the electronic mirror 2 is used at night or when the displayed image is darkened, the brightness of the rear of the vehicle may vary at time, for example, when the headlight of the following vehicle 5 turns on/off or when the headlight of the following vehicle approaches. The camera 1 might adjust the exposure time and frequently switch the exposure time to ensure brightness of the rear of the vehicle. Frequently switching the exposure time makes it difficult to view the video displayed on electronic mirror 2 with high visibility.

To handle this, the third adjustment module 1220 adjusts the exposure time using histogram automatic exposure. In the histogram automatic exposure, for example, the illuminance having a lowest input illuminance acquired by the pixel unit 111 is set as a predetermined threshold, and the estimated illuminance determination module 1218 adjusts the exposure based on a determination module of whether the predetermined threshold is exceeded.

With this configuration, the third adjustment module 1220 can reduce the switching frequency of the exposure time even in a state where the brightness of the rear of the vehicle varies.

A program executed by the electronic mirror system 3 of the present embodiment is provided by being incorporated in ROM or the like in advance. The programs executed by the electronic mirror system of the present embodiment may be provided as a file in an installable format or an executable format, recorded in a computer readable recording medium such as CD-ROM, a flexible disk (FD), a CD-R, or a Digital Versatile Disk (DVD).

The programs executed on the electronic mirror system of the present embodiment may be stored on a computer connected to a network such as the Internet and be provided by downloading via the network. Furthermore, the programs executed in the electronic mirror system of the present embodiment may be provided or distributed via a network such as the Internet.

According to the image processing device of the present disclosure, it is possible to more clearly display an image captured by the imaging device provided in the cabin.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising:
a memory in which a program is stored; and
a processor coupled to the memory and configured to perform processing by executing the program, the processing including:
acquiring, from an imaging device mounted in a cabin of a vehicle, an image of an outside of the cabin captured through a window provided in the vehicle by the imaging device;
acquiring a color temperature from the acquired image;
detecting a first color temperature range regarded as white by the imaging device from the acquired color temperature;
adjusting the first color temperature range to a second color temperature range by referring to a table that stores color temperature ranges corresponding to spectral characteristics of the window provided in the vehicle;
adjusting white balance of the image based on the second color temperature range; and
outputting the image of which the white balance is adjusted.

2. The image processing device according to claim 1, wherein
the processing further includes adjusting the white balance according to a transmittance characteristic of the window provided in the vehicle.

3. The image processing device according to claim 2, wherein the processing further includes adjusting a gain of the imaging device according to an input illuminance acquired by the imaging device.

4. The image processing device according to claim 2, wherein
the processing adjusts the white balance of the image so that a color temperature of the image becomes a color temperature to be captured by an imaging device mounted outside the cabin.

5. The image processing device according to claim 3, wherein
the processing further includes adjusting an exposure time of the imaging device according to the input illuminance.

6. The image processing device according to claim 3, wherein
the processing adjusts the white balance of the image so that a color temperature of the image becomes a color temperature to be captured by an imaging device mounted outside the cabin.

7. The image processing device according to claim 5, wherein
the processing adjusts the white balance of the image so that a color temperature of the image becomes a color temperature to be captured by an imaging device mounted outside the cabin.

8. The image processing device according to claim 1, wherein
the processing further includes adjusting a gain of the imaging device according to an input illuminance acquired by the imaging device.

9. The image processing device according to claim 8, wherein
the processing further includes adjusting an exposure time of the imaging device according to the input illuminance.

10. The image processing device according to claim 8, wherein
the processing adjusts the white balance of the image so that a color temperature of the image becomes a color temperature to be captured by an imaging device mounted outside the cabin.

11. The image processing device according to claim 9, wherein
the processing adjusts the white balance of the image so that a color temperature of the image becomes a color temperature to be captured by an imaging device mounted outside the cabin.

12. The image processing device according to claim 1, wherein
the processing adjusts the white balance of the image so that a color temperature of the image becomes a color temperature to be captured by an imaging device mounted outside the cabin.

13. An image processing method comprising:
acquiring, from an imaging device mounted in a cabin of a vehicle, an image of an outside of the cabin captured through a window provided in the vehicle by the imaging device;
acquiring a color temperature from the acquired image;
detecting a first color temperature range regarded as white by the imaging device from the acquired color temperature;
adjusting the first color temperature range to a second color temperature range by referring to a table that stores color temperature ranges corresponding to spectral characteristics of the window provided in the vehicle;

adjusting white balance of the image based on the second color temperature range; and outputting the image of which the white balance is adjusted.

14. The image processing method according to claim 13, wherein the adjusting includes adjusting the white balance according to a transmittance characteristic of the window provided in the vehicle.

15. The image processing method according to claim 13, wherein the adjusting includes adjusting a gain of the imaging device according to an input illuminance acquired by the imaging device.

16. The image processing method according to claim 14, wherein the adjusting includes adjusting a gain of the imaging device according to an input illuminance acquired by the imaging device.

17. A computer program product including programmed instructions embodied in and stored on a non-transitory computer readable medium, wherein the instructions, when executed by a computer, cause the computer to perform:

acquiring, from an imaging device mounted in a cabin of a vehicle, an image of an outside of the cabin captured through a window provided in the vehicle by the imaging device;

acquiring a color temperature from the acquired image;

detecting a first color temperature range regarded as white by the imaging device from the acquired color temperature;

adjusting the first color temperature range to a second color temperature range by referring to a table that stores color temperature ranges corresponding to spectral characteristics of the window provided in the vehicle;

adjusting white balance of the image based on the second color temperature range; and outputting the image of which the white balance is adjusted.

18. The computer program product according to claim 17, wherein the adjusting includes adjusting the white balance according to a transmittance characteristic of the window provided in the vehicle.

19. The computer program product according to claim 17, wherein the adjusting includes adjusting a gain of the imaging device according to an input illuminance acquired by the imaging device.

20. The computer program product according to claim 18, wherein the adjusting includes adjusting a gain of the imaging device according to an input illuminance acquired by the imaging device.

* * * * *